Aug. 11, 1953     J. HAHN     2,648,383
BLOOM SHEAR
Filed Oct. 17, 1946     2 Sheets-Sheet 1
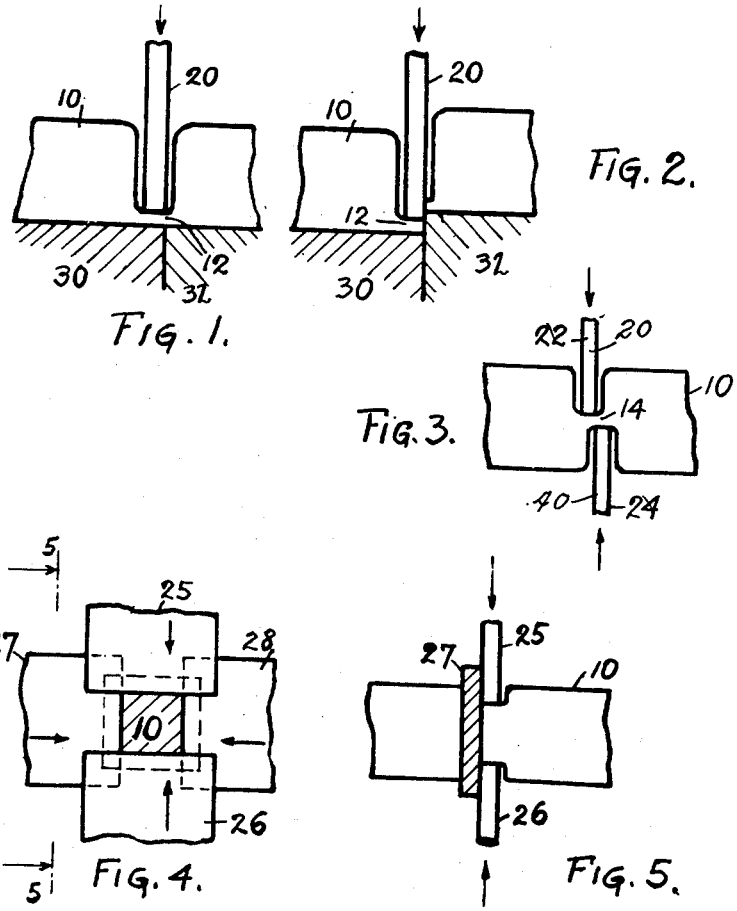
INVENTOR.
JOHANN HAHN
BY
*Kump and Koster*
HIS ATTORNEYS Aug. 11, 1953    J. HAHN    2,648,383
BLOOM SHEAR
Filed Oct. 17, 1946    2 Sheets-Sheet 2

INVENTOR.
JOHANN HAHN
BY
Kumy and Koster
HIS ATTORNEYS.

Patented Aug. 11, 1953

2,648,383

UNITED STATES PATENT OFFICE 2,648,383

BLOOM SHEAR

Johann Hahn, Brooklyn, N. Y.

Application October 17, 1946, Serial No. 703,831
In Germany April 3, 1939

6 Claims. (Cl. 164—47)

The present invention relates to a bloom shear for severing or subdividing blooms or bars of plastic material such as hot metal and to a method for severing such blooms.

The term "bloom" as used hereinafter in the specification and claims is intended to refer to a bloom, ingot, bar, or the like, of any plastic material, such as hot metal.

Blooms have hitherto been cut prior to rolling or other operations by means of bloom shears that exert sufficient shearing force on opposite sides of a bloom to overcome the total shearing resistance of the bloom. This type of bloom shear requires the application of enormous shearing forces, causes undesirable deformation of the bloom at the point of separation and requires an intricate and cumbersome shear depression table to bring the cut bars of the bloom back to the level of the conveyor or supporting table for the subsequent rolling operation.

One object of the present invention is to provide a method and apparatus for cutting, severing, or subdividing blooms with a minimum of applied force and very little deformation in the shape of the bloom.

Another object of the invention is to provide apparatus for severing bars of plastic material which is simple in construction and does not require the bed of the bloom conveying rollers to be provided with a shear depression table.

In accordance with my invention, these and other advantages which are incidental to its application can be attained by a combined cutting and shearing operation wherein a cutting member is used to cut almost entirely through the bloom to leave a relatively small uncut segment which is thereupon sheared off to complete severance.

In the accompanying drawing which illustrates the method and preferred forms of apparatus embodying features of the invention:

Figure 1 is a diagrammatic section showing the position of a cutting tool shortly before complete severance is effected;

Figure 2 is a diagrammatic sectional view showing the position of the functional parts of the appartaus just after final severance has been completed;

Figure 3 is a diagrammatic section of an embodiment employing two oppositely disposed cutting members;

Figure 4 is a diagrammatic sectional elevation showing an embodiment of the invention wherein four cutting members are employed;

Figure 5 is a diagrammatic sectional view of the embodiment illustrated in Figure 4 looking in the direction of the arrows along section line 5—5;

Figure 6:
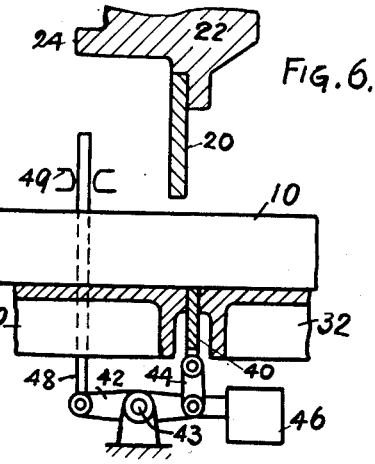
Figure 6 is a sectional elevation of a preferred embodiment showing the essential parts of the apparatus and the relative positions of the cutting member and the bloom at the start of the cutting operation.

In accordance with my invention, as illustrated in the drawing, it has been found that a bloom 10 can readily be cut by a blade or cutting member 20 without the application of substantial forces of the order heretofore required to sever the bloom by shearing. The thickness of the cutting tool or blade 20 depends to a large extent upon the cross section of the bloom to be cut but for the most part may be of the order of about one inch and may be of a width extending one or more inches beyond the edge of the bloom on either side. For obvious reasons the blade 20 is preferably made of a strong, heat resistant material. During the cutting operation the bloom 10 is preferably supported upon a stationary or rigid table portion 30 and a movable table portion 31, the right edge of cutting tool 20 being substantially in line with the line of separation between table portions 30 and 31. As illustrated in Figures 1 and 2, the method of cutting a bloom in accordance with one modification of the present invention comprises pushing cutting member 20 into bloom 10 until the leading edge of the cutting member 20 has been depressed sufficiently to leave only a relatively small connecting section 12 between the two portions of bloom 10 on either side of cutting member 20. At this point movable table portion 31 is raised to the position shown in Figure 2 so that segment 12 beneath cutting member 20, which remains stationary, is sheared off to make the severance between the two portions of bloom 10 complete.

Another modification of the present invention, as illustrated in Figure 3, comprises the use of two oppositely disposed but offset cutting members 22 and 24 which are pressed inwardly simultaneously until a small remaining segment 14 is sheared off between them.

Still another modification of the method of this invention, as illustrated in Figures 4 and 5 comprises the use of four cutting members 25, 26, 27, and 28. Each cutting member is forced toward the center of bloom 10 until severance is completed.

Figure 7:
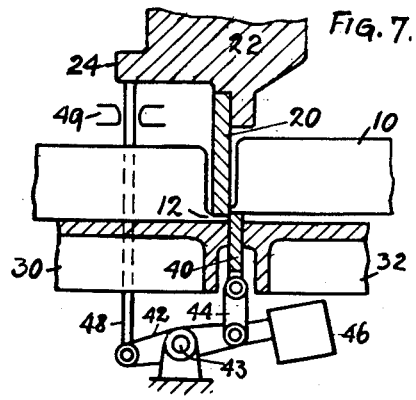
Figure 7 is a similar view of the embodiment shown in Figure 6 illustrating the position of the various parts at the completion of the severance.

The apparatus illustrated in Figures 6 and 7 includes table portions 30 and 32 supporting a bloom 10, a ram or holder 22 supporting cutting member 20 above bloom 10 and a shearing tool 40 disposed between table portions 30 and 32 and supported upon lever 42 by means of a link 44. Lever 42 in turn is supported in bearing 43, provided with weight 46 at one end to maintain the position of shearing member 40 in its normally flush position with reference to the supporting surfaces of table portions 30 and 32. A rod 48 slideably mounted in guide 49 is pivotally mounted at the other end of lever 42. The upper end of rod 48 is engageable with extension 24 of ram 22.

In operation, a bloom 10 is slid or rolled on table portions 30 and 32 into position below cutting member 20. Conventional mechanism (not shown) is then actuated to move cutting member 20 downwardly to perform its cutting stroke. Shortly before the downward stroke of cutting member 20 reaches the position shown in Figure 7, extension 24 of ram 22 engages the top of rod 49 which thereupon, by means of lever 42 and link 44, operates to raise shearing member 40 between table portions 30 and 32. By reason of the delayed action of lower shearing member 40, only a relatively small segment 12 of bloom 10 is subjected to direct shearing.

Figure 8:
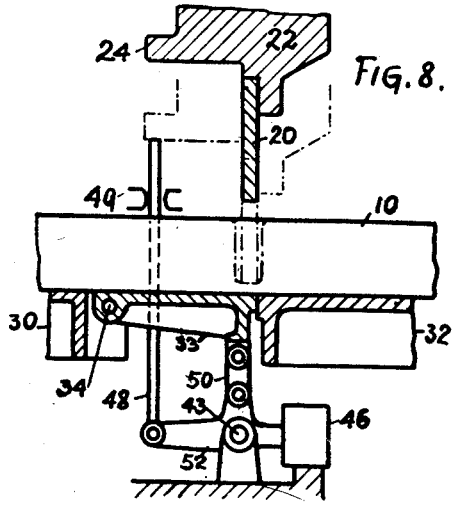
Figure 8 is a sectional elevation of another embodiment of the present invention showing the position of the various parts before the start of the cutting operation.
Figure 9:
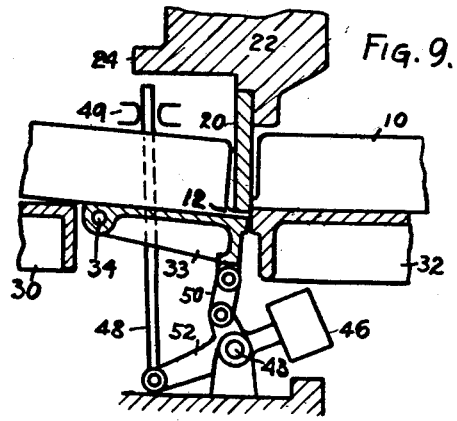
Figure 9 is a similar view of the embodiment illustrated in Figure 8 showing the position of the various parts at the completion of the severance of a bloom.

Another embodiment of the apparatus of the present invention, as illustrated in Figures 8 and 9, includes non-movable table portions 30 and 32 and a tiltable table portion 33 pivoted at 34. Cutting member 20 is mounted on a ram or holder 22 provided with an extension 24 as previously described with reference to Figures 6 and 7. Tiltable table portion 33 is supported in position flush with the top of table portions 30 and 32 by means of a link 50 connected to a bell crank 52 mounted at the center in bearing 43 and provided at one end with a weight 46 and at the other end with a rod 48 slideably mounted in guide 49.

In the operation of this modification ram 22 is depressed to force cutting member 20 into bloom 10 by mechanical, hydraulic, or electrical means to the position indicated by the dotted lines. Shortly before the end of the stroke of cutting member 20, extension 24 of ram 22 engages and depresses rod 48 so that the toggle comprising link 50 and bell crank lever 52 is broken to the end that the connection between link 50 and bell crank lever 52 is thrown off dead center and tiltable table portion 33 is depressed. The weight of bloom 10 on tiltable table portion 33 and further travel of cutting member 20 to the position shown in Figure 9 causes segment 12 of bloom 10 between the lower edge of cutting member 20 and tiltable table portion 33 to be sheared off. When ram 22 and cutting member 20 move back to their upper position, weight 46 causes bell crank lever 52 to turn clockwise until tiltable table portion 33 is again flush with table portions 30 and 32 and rod 48 is raised to its initial position.

Figure 10:
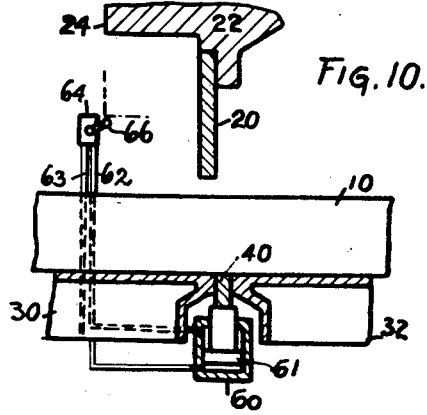
Figure 10 is a sectional elevation of a third embodiment showing diagrammatically the positions of the various parts prior to the cutting operation.

A further modification of the apparatus of the invention as illustrated diagrammatically in Figure 10 includes table portions 30 and 32 supporting bloom 10 and having disposed between them a hydraulically connected actuated shearing member 40. Hydraulic cylinder 60, provided with a piston assembly 61 upon which cutting member 40 is supported, is connected by means of pipes 62 and 63 to an operating valve 64 having a lever 66 actuated by contact with extension 24 of ram 22 holding cutting member 20.

In operation ram 22 depresses cutting member 20 into bloom 10 until only a small unconnected segment 12 remains, whereupon extension 24 of ram 22 engages lever 66 to actuate valve 64. The operation of valve 64 causes an increase in pressure below piston assembly 61 with the result that shearing member 40 is moved upwardly between table portions 30 and 32 so as to shear off the remaining uncut segment 12 of bloom 10. Withdrawal of cutting member 20 and ram 22 to its initial upper position releases lever 66 of valve 64 to return shearing member 40 and piston assembly 61 by means well known to the art.

The following example is illustrative only and is not intended to limit the scope of the invention in any way:

A bloom of hot metal having a cross section of ten inches by ten is placed on the table shown for instance in Figure 1. A cutting member having a thickness of one inch and a width of 12 inches is forced into the bloom until a coherent segment of from about ¼″ to about ½″ remains. As shown diagrammatically in Figure 1, the flow of the plastic metal is such that it becomes substantially separated from the parallel sides of the cutting member during the cutting stroke. Severance of the bloom is completed by shearing off the small uncut, coherent segment that remains at the end of the cutting stroke.

It is of course to be expected that various changes, alterations and modifications will occur to those skilled in the art upon reading the present disclosure. It is to be understood, however, that the modifications disclosed herein are described for illustrative purposes only and are not intended to limit the scope of the appended claims.

I claim:

1. Apparatus for severing a bloom comprising a supporting surface for said bloom, a penetrating member positioned above said supporting surface with the forward edges of said member and surface in alignment, a shearing member having an upper surface flush with said supporting surface and abutting the edge thereof, means for moving said penetrating member toward said supporting surface, and means actuated by the downward movement of said penetrating member to actuate said shearing member upwardly into shearing relationship with said penetrating member in the latter portion of the movement of said penetrating member.

2. Apparatus for severing a bloom comprising a supporting surface for said bloom including a rigid portion, an adjacent depressable portion and a locking mechanism for holding said depressable portion in alignment with said rigid portion, a penetrating member with the forward edges of said member and said depressable portion of said surface in alignment and positioned above said supporting surface at a point substantially directly above the juncture between said rigid and said depressable surface, means for moving said penetrating member toward said supporting surface, and delayed action means actuated by the downward movement of said penetrating surface during the last portion of its movement to unlock said locking mechanism and thereby to depress said depressable surface portion to permit the abutting edge of said rigid supporting surface to come into shearing relationship with said penetrating member.

3. Apparatus for severing a bloom comprising a supporting surface for said bloom including a rigid portion and an adjacent depressable portion, a penetrating member with the forward edges of said member and said depressable portion of said surface in alignment and positioned above said supporting surface at a point substantially directly above the juncture between said rigid and said depressable surface, means for moving said penetrating member toward said supporting surface, means for maintaining the depressable surface portion in alignment with said rigid surface portion against pressure exerted on said depressable surface and means actuated by the downward movement of said penetrating member to release said means for maintaining said depressable surface in alignment and thereby permit the depression of said depressable surface portion during the latter part of the movement of said penetrating member to permit the abutting edge of said rigid supporting surface to come into shearing relationship with said penetrating member.

4. Apparatus for severing a bloom comprising a supporting surface for said bloom, a penetrating member positioned above said supporting surface with the forward edges of said member and surface in alignment, a shearing member having an upper surface flush with said supporting surface and abutting the edge thereof, a ram for moving said penetrating member toward said supporting surface, an extension on said ram, a rod like element adapted to engage with the extension on said ram when said ram has moved said penetrating member to within a small fraction of the thickness of a bloom from said supporting member, said rod like element being connected to said shearing member through a lever element, said rod like element upon being engaged by the said extension on said ram coacting with said lever to raise said shearing member upwardly into shearing relationship with said penetrating member.

5. Apparatus for severing a bloom comprising a supporting surface for said bloom, including a rigid portion and an adjacent depressable portion, a penetrating member with the forward edges of said member and said depressable portion of said surface in alignment and positioned above said supporting surface at a point substantially directly above the juncture between said rigid and said depressable surface, a bell crank and link combination adapted to support said depressable surface when said combination is on dead center, means for moving said penetrating member toward said supporting surface, and delayed action means actuated by the downward movement of said penetrating member to throw said bell crank lever and link combination off center and thereby permit the depression of said depressable surface portion during the latter part of the movement of said penetrating member to permit the abutting edge of said rigid supporting surface to come into shearing relationship with said penetrating member.

6. Apparatus for severing a bloom comprising a supporting surface for said bloom including a rigid portion and an adjacent depressable portion, a penetrating member with the forward edges of said member and said depressable portion of said surfaces aligned and positioned above said supporting surface at a point substantially directly above the juncture between said rigid and said depressable surface, means for moving said penetrating member toward said supporting surface, a bell crank lever and link combination for maintaining the depressable portion in alignment with said rigid surface portion against pressure exerted on said depressable surface when said bell crank lever link combination is on dead center, a rod like element connected to one end of said bell crank lever extending upwardly toward a means for moving said penetrating member toward said supporting surface and being adapted to engage with said moving means when said penetrating member has been moved to within a small fraction of the thickness of the bloom from said supporting member, said rod like element upon being so engaged coacting with said bell crank lever mechanism to throw its link connection with the depressable table section off center and thus permit the abutting edge of said rigid supporting surface to come into shearing relationship with said penetrating member.

JOHANN HAHN.

References Cited in the file of this patent

UNITED STATES PATENTS

| Number | Name | Date |
|---|---|---|
| 224,827 | Hewitt | Feb. 24, 1880 |
| 552,784 | Sheldon | Jan. 7, 1896 |
| 584,658 | Aiken | June 15, 1897 |
| 810,845 | Cromwell | Jan. 23, 1906 |
| 891,626 | Loss | June 23, 1908 |
| 923,109 | Biggert | May 25, 1909 |
| 1,559,083 | Friederici | Oct. 27, 1925 |
| 1,663,092 | Parys | Mar. 20, 1928 |
| 1,960,125 | Schorn | May 22, 1934 |
| 2,109,921 | Leach | Mar. 1, 1938 |